United States Patent [19]
VanDenberg

[11] Patent Number: 5,791,681
[45] Date of Patent: Aug. 11, 1998

[54] SINGLE BEAM SUSPENSION SYSTEM

[75] Inventor: Ervin K. VanDenberg, Massillon, Ohio

[73] Assignee: Rockwell Heavy Vehicle Suspension Systems, Inc., Canal Fulton, Ohio

[21] Appl. No.: 756,955

[22] Filed: Dec. 2, 1996

[51] Int. Cl.$^6$ ............................................... B60G 11/26
[52] U.S. Cl. ........................... 280/713; 280/688; 280/711
[58] Field of Search .................................. 280/688, 628, 280/683, 698, 711, 713, 112.1; 267/256, 241

[56] References Cited

U.S. PATENT DOCUMENTS

| | | | |
|---|---|---|---|
| 3,133,745 | 5/1964 | Granning | 280/112 |
| 3,380,258 | 4/1968 | Granning | 280/711 |
| 3,420,543 | 1/1969 | Strifler et al. | 280/213 |
| 3,689,102 | 9/1972 | Granning | 280/112 R |
| 3,713,663 | 1/1973 | Granning | 280/112 R |
| 3,747,948 | 7/1973 | Granning | 280/112 R |
| 4,171,830 | 10/1979 | Metz | 280/711 |
| 4,248,447 | 2/1981 | Hart | 280/112.1 |
| 4,415,179 | 11/1983 | Marinelli | 280/713 |
| 5,039,124 | 8/1991 | Widmer | 280/711 |
| 5,112,078 | 5/1992 | Galazin et al. | 280/711 |
| 5,133,575 | 7/1992 | Zantinge et al. | 280/708 |
| 5,366,237 | 11/1994 | Dilling et al. | 280/711 |
| 5,403,031 | 4/1995 | Gottschalk et al. | 280/704 |

FOREIGN PATENT DOCUMENTS

| | | |
|---|---|---|
| 952136 | 7/1974 | Canada . |
| 1389149 | 11/1973 | Germany . |

OTHER PUBLICATIONS

Granning Suspension Systems, Truck Suspension Brochure, Feb. 1, 1983.

Primary Examiner—Christopher P. Ellis
Attorney, Agent, or Firm—Sand & Sebolt

[57] ABSTRACT

A vehicle suspension system having a pair of spaced apart control arms, and a central beam positioned intermediate the control arms. The central beam and the control arms are pivotally mounted to the frame at one end, and secured to the axle at another end. At least one air spring extends between the axle and the frame to support vertical load, and the center beam. The center beam has sufficient width to provide a roll stable suspension, while remaining resistant to lateral deflection. The pivotal connection at the central beam provides a bushing, which may have a constant spring rate, or which may include a spring rate which varies in the vertical and horizontal direction. In a second embodiment, a lift mechanism is provided for raising the axle from a ground engaging to a non-ground engaging position. In yet another embodiment, the suspension system is provided as a primary suspension.

21 Claims, 7 Drawing Sheets

SINGLE BEAM SUSPENSION SYSTEM

BACKGROUND OF THE INVENTION

1. Technical Field

The invention relates generally to an improved suspension system for land vehicles. More particularly, the invention relates to trailing beam air suspension systems. Specifically, the invention relates to trailing beam air suspension systems having a single beam.

1. Background Information

With the advent following World War II of large load carrying capacity trucks and trailers in this country, came the need to provide vehicle with multiple axles for increasing the capacity of trucks over that of previously existing designs. While the use of additional axles effectively increased load-carrying capacity, it was soon realized that as the number of load bearing axles increased on a given vehicle, a number of difficulties arose. Specifically, tire scuffing, loss in fuel economy and the inability to safely corner, all work problems associated with multiple axle vehicles. Mitigation of these problems was a primary concern to the industry, which concern resulted in the development of a variety of suspension systems, both liftable and non-liftable. Liftable suspensions could be selectively raised from the road surface or lowered into engagement with the road surface when needed, thereby mitigating a number of the aforementioned problems. Additionally, non-liftable axles have been designed for a variety of purposes, and specifically a number of specialty chassis-cap type vehicles require additional load-carrying capacity. More specifically, auxiliary suspension systems are necessary for trash compactor trucks and concrete mixing and delivery vehicles. Cab-chassis trucks of this type require additional suspensions as the truck has a relatively large weight when compared to the overall vehicle length.

Suspension systems may take a variety of forms, including parallelogram suspensions, and leading and trailing beam-type suspensions. Generally, leading and trailing beam-type suspensions include a pair of longitudinally extending beams which may be either flexible or rigid, one of which is located adjacent each of two longitudinally extending frame rails located beneath the body of the truck or trailer. These beams are pivotally connected at one end to a hanger bracket extending downwardly from the frame, with an axle extending between the beams adjacent the other end. Additionally, an air or coil spring is generally positioned intermediate each frame rail and a corresponding beam. The beam may extend forwardly or rearwardly of the pivot, thus defining a leading or trailing beam suspension respectively.

Beam-type suspension systems are used on a significant number of trucks and trailers, and must have sufficient strength to resist lateral and axial deflection while remaining stable. Lateral forces act on a suspension system in a variety of ways with the most common being that lateral forces act on a suspension as a vehicle negotiates a turn. As the vehicle turns, shear stress acts between the tire and the road surface causing a lateral stress to be transferred through the tire-wheel assembly to the axle. The axle, being rigidly attached to the suspension, transfers the lateral force into the beam causing it to deflect laterally. This lateral deflection can be extreme, and under certain loading conditions, can cause the tires to contact the vehicle frame rails.

Roll stability refers to the counter-acting forces operating on the ends of an axle causing one end of the axle to raise relative to the frame a distance greater than the other end of the axle. Roll instability is encountered when the vehicle frame tilts or rolls relative to the axle; for example, when the vehicle negotiates a turn such that the centrifugal and acceleration forces reduce the downward forces acting on the inside wheel of the turn, and increase the downward force acting on the outside wheel of the turn. Roll instability is also realized when the axle moves relative to the frame; for example, during diagonal axle walk.

Diagonal axle walk occurs when the wheels of the opposite ends of the axle encounter unlike irregularities in a road or off-the-road surface, such as when one wheel rides over a curb. As the wheel rides over the curb, an upward force acts on that wheel, and a counteracting downward force acts on the wheel not riding over the curb. If the suspension is unable to provide flexibility between the axle and the frame as the tire-wheel assembly travels over the curb or ground irregularity, or alternatively to provide flexibility between the axle and the frame as the vehicle negotiates a turn, the suspension will be roll rigid, and may cause axle breakage or over stress vehicle components, such as the frame. As such, beam-type suspensions must be roll stable while providing sufficient vertical support to retain the vehicle above the road surface.

Further, most vehicles designed with a beam-type suspension have a path of travel which is parallel to the frame rails extending longitudinally under the vehicle. For vehicles having only a front and a rear axle, the vehicle path of travel is generally defined by the parallel and spaced apart rear tires such that the direction of travel of the rear tires defines the path of travel of the vehicle. For vehicles having only a front and a rear axle, this path of travel is adequate and safe even if the rear tires are not positioned parallel with the vehicle frame rails. However, when multiple axles are utilized, such as when auxiliary suspension systems are provided on a vehicle, the path of travel of each axle must be aligned with the line of travel of the remaining axles carried by the vehicle for safe vehicle operation.

Specifically, if one axle is aligned with the longitudinal frame rails extending under the vehicle, and a second axle is offset relative to the longitudinal frame rails of the vehicle, as the vehicle moves over the road surface, one axle and its associated tire-wheel assemblies will track along the path of travel of the vehicle, while the second axle, which includes tire-wheel assemblies which do not rotate in a direction parallel to the path of travel of the vehicle, will drag under the vehicle increasing tire scuffing, tire wear, and creating a generally unsafe condition. When multiple axles are utilized, generally all tires affect the vehicle path of travel to some degree such that if one axle is offset relative to the vehicle path of travel, all tires will scuff, and drag under the vehicle. Additionally, as the tires drag under the vehicle due to their misalignment, they continually add lateral forces to the suspension system, and consequently to the vehicle frame substantially reducing the life span of both the vehicle frame and suspension system components.

However, if the axles are aligned relative to the frame rails such that the tires rotate in a line parallel to the vehicle path of travel, the tire-wheel assemblies will rotate smoothly under the vehicle substantially increasing vehicle safety and vehicle performance as well as substantially increasing tire life.

For the above reasons, and specifically for safety and vehicle performance, it is necessary that each axle be carefully aligned with the vehicle, and with other load bearing axles carried by the vehicle to present a plurality of parallel and spaced apart tire-wheel assemblies for engaging the road surface and defining the precise direction of vehicle movement along the vehicles path of travel. Such alignment is difficult for a number of reasons. Trailers as well as suspension systems may be manufactured out of tolerance, vehicle frame rails may not be perfectly parallel, and suspension systems may not be accurately mounted to the frame rails. These problems may be especially pronounced when suspension systems are added to existing equipment which may have experienced significant use.

Thus, to accommodate for the above inconsistencies in manufacturing and suspension system installation, an alignment mechanism is often included as part of the suspension system such that after the suspension system is installed on a vehicle, the axle may be moved relative to the vehicle to assure that the tire-wheel assemblies rotatably depending from the axle are substantially parallel to the vehicle path of travel. While a significant number of devices have been provided for this purpose, axle alignment continues to be a difficult process. Specifically, adjusting the axle relative to the beams has a number of problems associated therewith. Specifically, such adjustment is often difficult to achieve as there is significant weight which must be moved up and down the beam to achieve the adjustment. Additionally, alignment of the axle relative to the beam often includes welding the mounting bracket to the beam after initial alignment. As such, it is difficult and expensive to realign the axle after the vehicle has been in service.

An additional problem associated with trailing beam type suspensions is the increased torque load which is input into the axle. More specifically, inasmuch as the beams are spaced apart a distance from 35 inches to 41 inches, and each beam pivot point receives between 20,000 and 30,000 pounds of force when engaging in roll or diagonal axle walk, with each beam length being approximately 20 inches, it is not uncommon for the axle to be subjected to 50,000 foot pounds of torque in the area intermediate the respective leading or trailing beams. The axle is thus subjected to extremely high torque loads substantially affecting the axle and its operational characteristics. Additionally, the central portion of the axle positioned intermediate the trailing beams is not reinforced, thereby further effecting the axle resistance to torque load.

The need thus exists for a suspension system which is lightweight, is roll stable, and provides adequate vertical load-carrying characteristics, and which is resistant to lateral and longitudinal axial forces. Additionally, the need exists for a suspension system which provides an axle to beam connection which is lightweight, easy to assemble, simple to manufacture and easy to align relative to the vehicle path of travel. Still further, the need exists for a suspension system which may be utilized as a tag axle, or alternatively as an auxiliary axle beneath a usual truck or trailer. The need also exists for a suspension system which substantially eliminates axle torque while strengthening the central portion of the axle.

SUMMARY OF THE INVENTION

Objectives of the invention include providing vehicle suspension system which is roll stable, and resistant to lateral and longitudinal forces.

Another objective is to provide a vehicle suspension system which may be utilized as either an auxiliary suspension system or a principal suspension system beneath a usual truck or trailer.

Still another objective is to provide a vehicle suspension system which may be utilized as both a liftable and non-liftable suspension system.

A further objective is to provide an suspension system which utilizes a single beam and a pair of control arms.

Yet another objective is to provide a suspension system whereby the system may be easily adjusted to assure that the path of travel of the tire-wheel assemblies attached to the axle are parallel with the vehicle path of travel.

Yet a further objective is to provide a vehicle suspension system which will operate equally well on most vehicles.

Another objective is to provide a vehicle suspension system which provides an axle, and an auxiliary stabilizer bar rigidly attached to the vehicle frame.

A still further objective of the invention is to provide an suspension system whereby the pivot axis of the central beam is aligned with the pivot axis of each control arm.

A further objective of the invention is to provide a suspension system which substantially eliminates axle torque while simultaneously strengthening the central portion of the axle.

A still further objective is to provide such a vehicle suspension system which is of simple construction, which achieves the stated objectives in a simple, effective and inexpensive manner, and which solves problems and satisfies needs existing in the art.

These and other objectives and advantages of the invention are obtained by the improved auxiliary suspension system, the general nature of which may be stated as including an axle; a suspension frame; a pair of spaced apart control arms extending between the axle and the suspension frame; a central beam extending between the suspension frame and the axle and intermediate the control arms; and at least one air spring adapted to extend intermediate one of the vehicle frame and suspension frame and the axle.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

Figure 1:
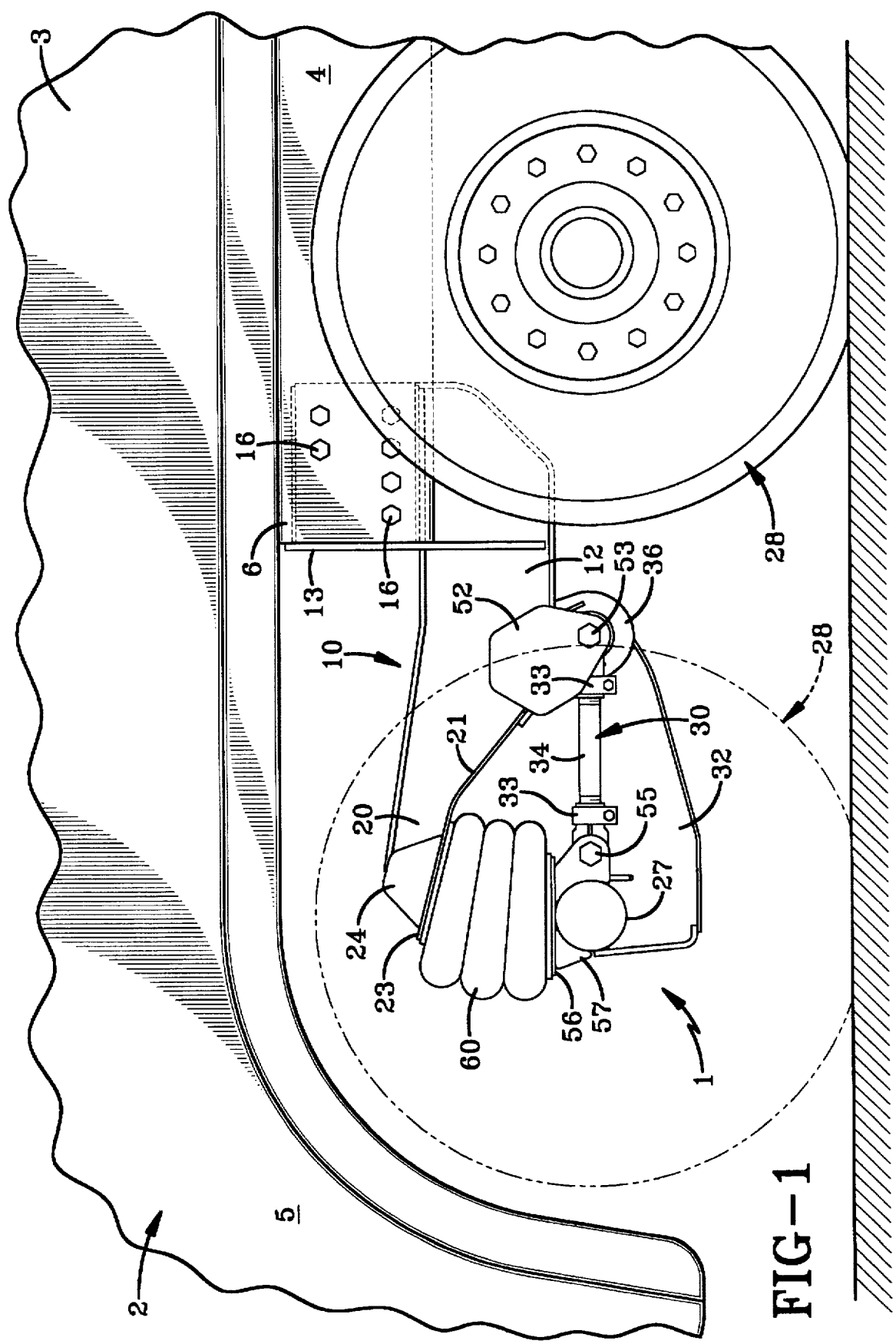
FIG. 1 is a side elevational view of the suspension system of the present invention shown attached to a vehicle and with the tire-wheel assemblies shown in dot-dash lines.

The improved suspension system of the present invention is indicated generally at 1, and is particularly shown in FIG.

1 mounted on a vehicle 2 such as a truck or trailer. While vehicle 2 may take a variety of sizes and configurations without departing from the spirit of the present invention, in the preferred embodiment, vehicle 2 is a garbage packer which includes a cargo box 3 supported by a pair of frame rails 4 extending longitudinally beneath cargo box 3 and along the length of vehicle 2. Cargo box 3 is curved and provides a loading chute 5 for inserting trash therein. Additionally, each frame rail 4 includes an end 6 onto which suspension system 1 is mounted.

Figure 2:
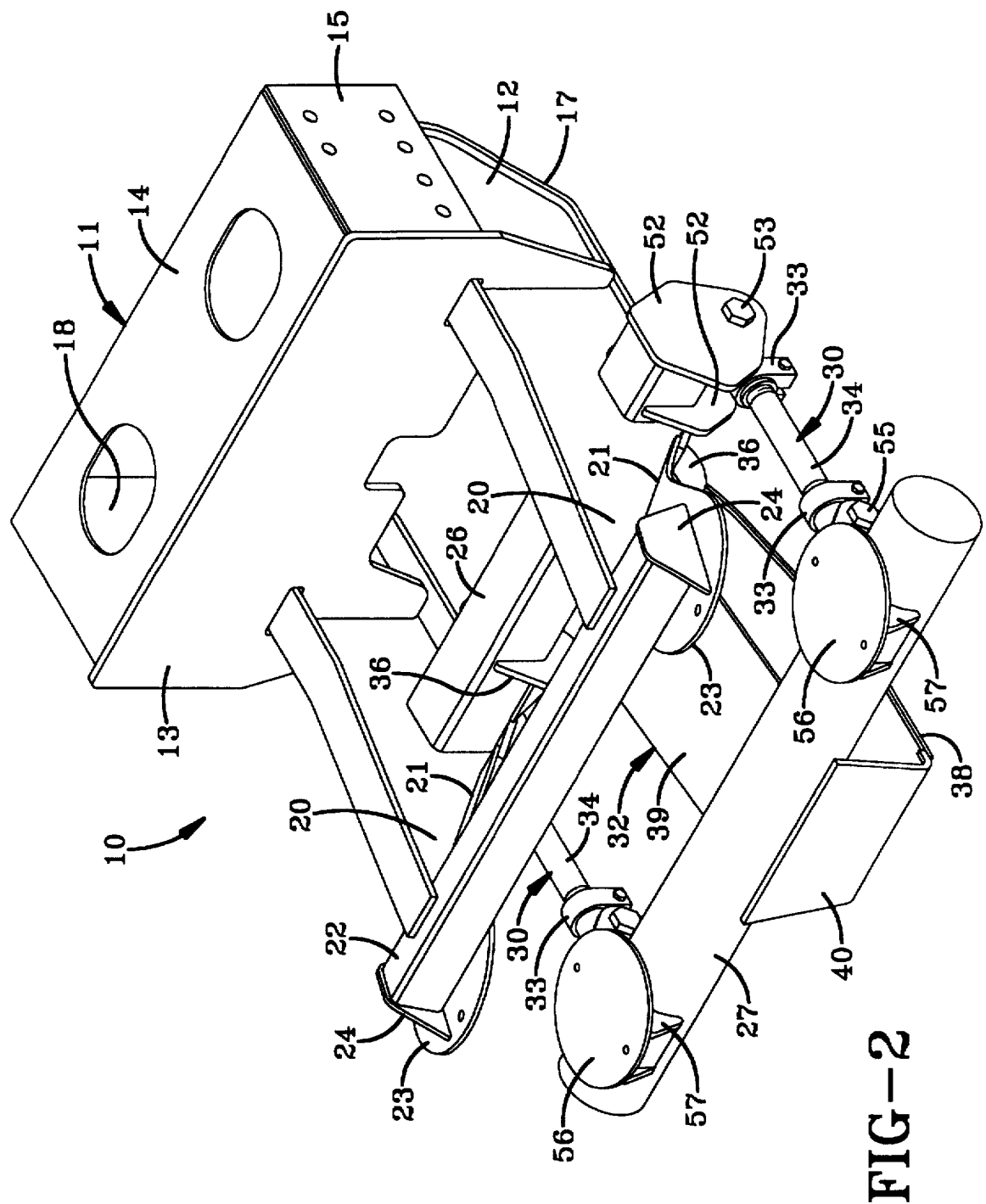
FIG. 2 is an enlarged perspective view of the suspension system shown in FIG. 1 with the air springs and tire-wheel assemblies removed.

Referring to FIGS. 1 and 2, suspension system 1 includes a frame extension assembly indicated generally at 10. Frame extension assembly, or suspension frame, 10 includes a mounting box 11 and a pair of parallel and spaced apart extension rails 12. Mounting box 11 includes a front plate 13 which extends over extension rails 12, a top plate 14 and a pair of parallel and spaced apart side plates 15. Side plates 15 are spaced apart a distance substantially equal to the distance between frame rails 4 such that end 6 of frame rails 4 may be positioned on either side of mounting box 11 and a plurality of bolts 16 may be utilized to fasten suspension system to frame rails 4. Extension rails 12 is also secured to mounting box 11 via a pair of spaced weld flanges 18, extending inwardly of extension rails 12.

Each extension rail 12 includes a strengthening flange 17 extending around the perimeter thereof. Additionally, each extension rail 12 includes a free end 20 having an upwardly inclined edge 21. A cross member 22 extends between free ends 20 of extension rails 12 and is substantially perpendicular thereto. While cross member 22 may be secured to extension rails 12 by any convenient method, in the preferred embodiment, cross member 22 is welded to extension rails 12 adjacent free end 20. A spring plate 23 is secured to each end of cross member 22 and is strengthened with a vertical strengthening flange 24. A stabilizer bar 26 extends between and through extension rails 12 and is substantially perpendicular to extension rails 12 and parallel to cross member 22. More specifically, stabilizer bar 26 is welded to extension rails 12 adjacent the bottom of inclined edge 21 of free end 20.

In accordance with one of the main features of the present invention, an axle 27 is pivotally supported from stabilizer bar 26 via a pair of spaced apart control arms 30 having a center bar 34 and a pair of attachment ends 33 and a central beam 32 positioned intermediate control arms 30. A tire-wheel assembly 28 is mounted to each end of axle 28. Control arms 30 may have a variety of sizes and configurations, but in the preferred embodiment, they are circular and include an adjustment mechanism for altering the length of each control arm 30. Still further, control arms 30 may be parallel, or be angled relative to one another without departing from the spirit of the present invention. The adjustment mechanism is ordinarily a turn buckle arrangement whereby rotation of a center bar 34 relative to attachment ends 59 increases and decreases the length of each control arm 30. Additionally, central beam 32 is centrally positioned intermediate control arms 30 and has sufficient width to offer roll stability to suspension system 1. Specifically, beam 32 has a width in the range of from 8 inches to 40 inches. The width of beam 32 may be increased to create a more roll rigid suspension, or decreased to create a more roll compliant suspension system.

In further accordance with the invention, a plurality of parallel and spaced apart pivot flanges 36 extend downwardly from stabilizer bar 26 and are spaced apart a distance equal to the width of central beam 32. A strengthening rib 35 extends between pivot flanges 36 and stabilizer bar 26.

Figure 8:
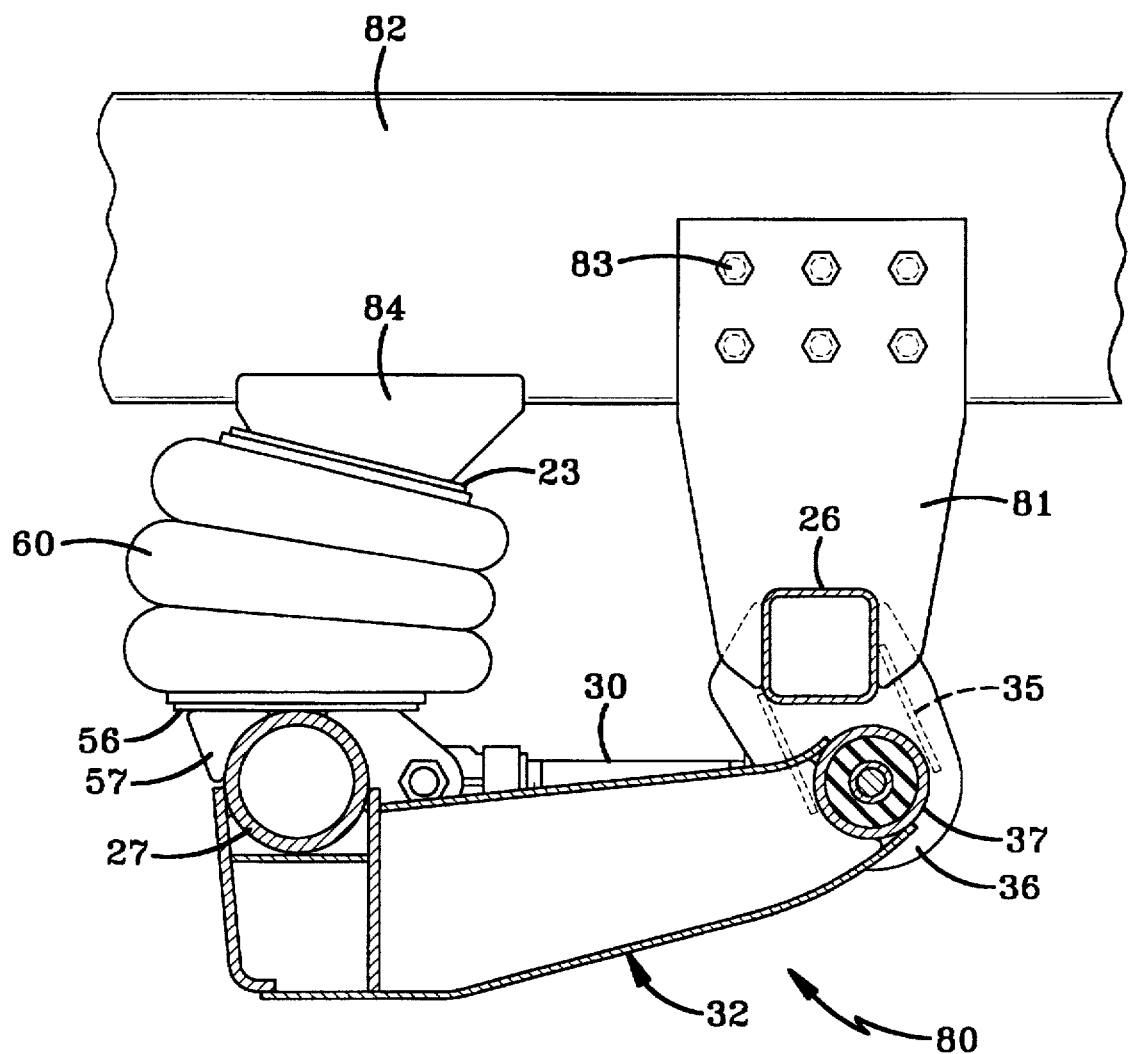
FIG. 8 is a sectional view, similar to FIG. 4, of a third embodiment of the present invention.

Central beam 32 is box-shaped and includes a tubular outer housing 37, a lower plate 38, an upper plate 39, and a rear wall 40 and a pair of spaced sidewalls 43 defining an inner cavity 44 (FIG. 8). Rear wall 40 is positioned adjacent axle 27 and is welded thereto. A vertical weld plate 41 is positioned adjacent axle 27 opposite rear wall 40 and a horizontal weld plate 42 extends intermediate vertical weld plate 41 and rear wall 40 to offer yet another weld surface for attaching axle 27 to central beam 32.

Figure 4:
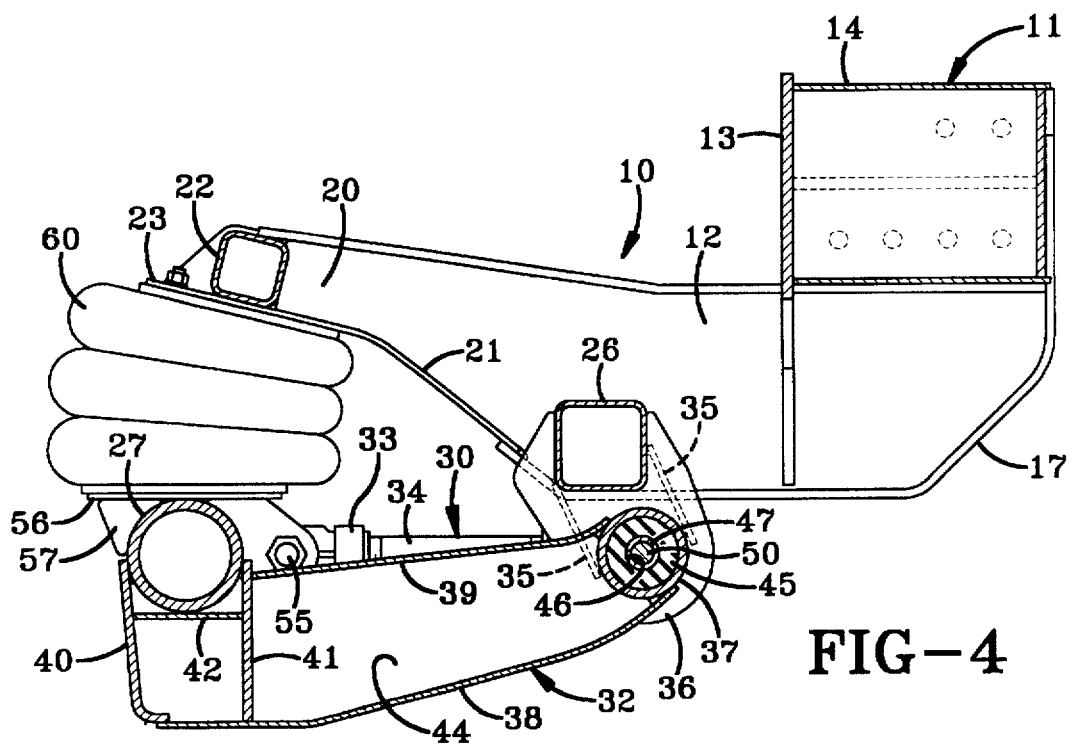
FIG. 4 is a sectional view taken along line 4—4, FIG. 3.

Tubular outer housing 37 is positioned between pivot flanges 36 and a pivot pin or bolt 50 extends through pivot flanges 36 and sleeve 47 to pivotally mount central beam 32 to stabilizer bar 26. Tubular outer housing 37 houses an elastomeric bushing 45 formed with a central aperture 46 for housing an inner sleeve 47. Elastomeric bushing 45 may have a constant spring rate in all directions, or alternatively it may include a vertical spring rate, a horizontal spring rate and an axial spring rate whereby each of the vertical spring rate, axial spring rate and horizontal spring rate differ. In this manner, the compliance of elastomeric bushing 45 may be tailored to the particular needs of suspension system 1. More particularly, the spring rate of bushing 45 may be increased if a roll rigid suspension system is required, or decreased if a roll flexible suspension is required. If bushing 45 is a single bushing as shown in FIG. 4, then the conical rate of bushing 45 is varied as discussed above. Alternatively, a pair of spaced apart bushings may be utilized, in which case, it is the vertical spring rate of bushing 45 which is varied. In order to obtain a roll rigid or roll flexible suspension.

A pair of parallel and spaced apart mounting flanges 52 extend downwardly from each end of stabilizer bar 26. Each mounting flange is formed with a through hole and accepts a mounting pin 53. Each mounting pin 53 extends through mounting flanges 52 and a control arm 30. Control arms 30 thus pivots around mounting pins 53 and an elastomeric bushing may be positioned intermediate control arm 30 and mounting pin 53 without departing from the spirit of the present invention. Central beam 32 thus pivots around pivot pin 50 while control arms 30 pivot about mounting pins 53 with the central axis of pivot pin 50 and mounting pins 53 being co-axial to assure that central beam 32 and control arm 32 pivot about the same axis. Similarly, a pair of parallel and spaced apart axle flanges 54 are mounted adjacent each end of axle 27 and a mounting bolt 55 extends through axle flanges 54 and control arm 30 to secure control arm 30 to axle 27. A bushing may be provided around mounting bolt 55 without departing from the spirit of the present invention and in order to provide compliance between axle 27 and control arms 30 as control arms 30 pivot relative to axle 27.

An air spring mounting plate 56 is secured to the axle directly beneath each spring plate 23. Air spring mounting plates 56 may be mounted to axle 27 by a variety of methods, but in the preferred embodiment, air spring mounting plates 56 are mounted to axle 27 via a plurality of weld flanges 57 which have a lower surface complementary shaped to axle 27, and an upper surface for accepting air spring mounting plate 56. In the preferred embodiment, an air spring 60 extends between each air spring mounting plate 56 and spring plate 23 (FIG. 4).

Operationally, suspension system 1 permits axle 27 to pivot about pivot pin 50 and mounting bolts 55 during use and in response to loads inputted into suspension system 1 through tire-wheel assemblies 28. Specifically, suspension system 1 may be installed onto a usual vehicle 2 by allowing mounting box 15 to be positioned between frame rails 4 and bolting suspension system to the end of frame rails 4 via a plurality of bolts 16. Once suspension system 1 is secured to frame rails 4, axle 27 may be aligned by increasing or decreasing the length of one or both control arms 30. Specifically, center bar 34 may be rotated to increase or decrease the length of the turnbuckle style control arm 30. By increasing and decreasing the length of a single control arm 30, one end of axle 27 will be moved forwardly or rearwardly as adjustment requires. Center bar 34 may be rotated until tire-wheel assemblies 28 of axle 27 are aligned with the path of travel of the remaining tire-wheel assemblies of other axles attached to vehicle 2. As the length of a control arm 30 is varied, bushing 45 will deflect within tubular outer housing 37 in order to assure that central beam 32 has sufficient compliance to move to a position substantially parallel to the path of travel of vehicle 2.

Additionally, the spring rate of bushing 45 may be varied in order to increase or decrease the roll compliance of the suspension system and therefore offer a roll stable suspension to vehicle 2 as discussed above. Still further, bushing 45 may be manufactured with varying spring rates, and more particularly bushing 45 may include a vertical spring rate, and a horizontal spring rate different from the vertical spring rate, as well as an axial spring rate which differs from both the horizontal spring rate and vertical spring rate thereby assuring that suspension system 1 may be tailored to meet the particular needs of vehicle 2.

Figure 3:
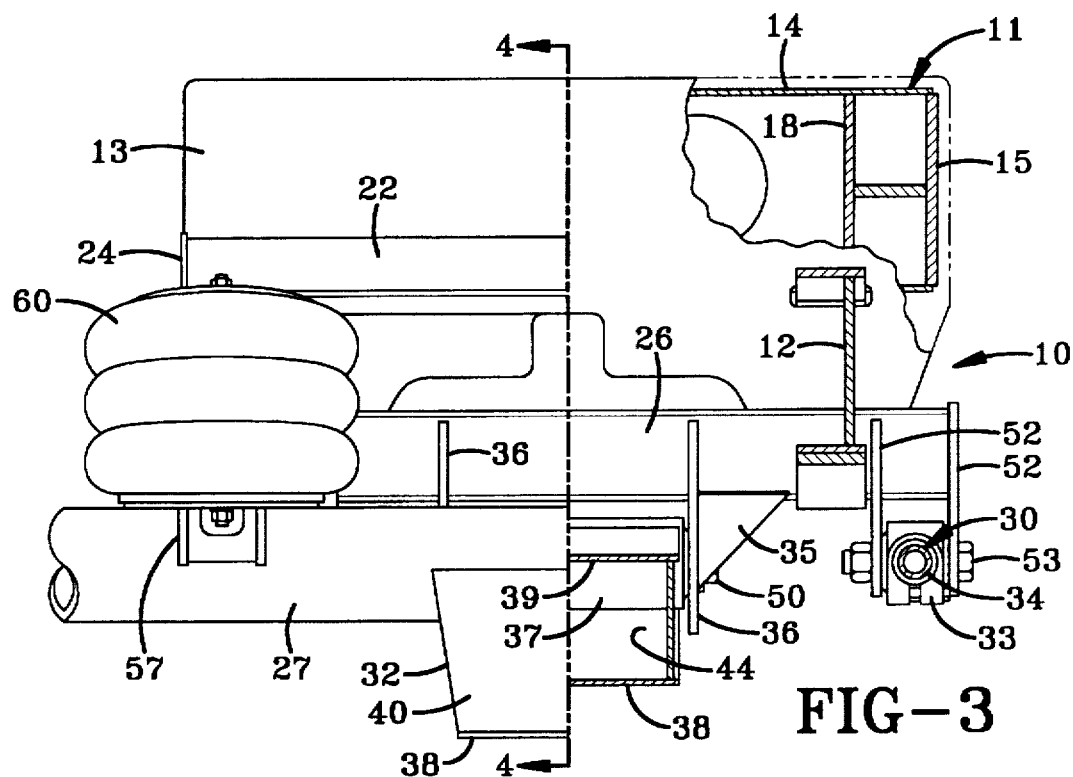
FIG. 3 is a rear end view of the suspension system shown in FIG. 2 partially cut away and in section.

In accordance with one of the main features of the invention, central beam 32 offers roll resistance and lateral stability to suspension system 1 via its welded interconnection with axle 27 and its bushed interconnection with stabilizer bar 26. Conversely, control arms 30 assist in reacting to longitudinal forces input into suspension system 1. As can be seen from a review of FIGS. 2–4, suspension system 1 substantially reduces the torque felt by axle 27 as central beam 32 attached to axle 27 provides a single input into axle 27 when compared to a traditional trailing beam type suspension system with separate trailing beams. More particularly, roll forces are input into a traditional trailing beam suspension in the range of from 20,000 to 30,000 pounds. Inasmuch as a usual beam length is 20 inches long, and applying the formula FL/12, where F is force, and L is beam length, the axle often experiences 50,000 foot pounds of torque between the trailing beams.

However, inasmuch as a single beam is provided at a position substantially central to the axle, torque is transmitted through the beam, to the central portion of the axle and does not transmit from one beam, through the axle and to the other beam. As such, the torque on axle 27 is substantially eliminated.

When the suspension system engages in diagonal axle walk or receives roll forces as a result of vehicle 2 negotiating a turn, bushing 45 will provide compliance in accordance with the design characteristics of suspension system 1. Suspension system 1 may be roll rigid or roll compliant depending on the spring rate of bushing 45. As one end of axle 27 is raised, bushing 45 will offer resistance, and transfer roll loads through a central beam 42 into axle 27. However, inasmuch as beam 32 is attached to axle 27 adjacent its central portion, and at a single location, no torque is imported into axle 27, but rather, axle 27 is subjected only to bending loads as a result of the movement of central beam 32 relative to tire-wheel assemblies 28.

Similarly, when lateral force is applied to tire-wheel assemblies 28, for example, when vehicle 2 negotiates a turn, bushing 45 will resist the lateral movement of axle 27 as a result of its horizontal spring rate. Additionally, as lateral force is input into suspension system 1, and force reacts at bushings 42, suspension system 1 will not translate laterally, as control arms 17 are fixed in length and will not permit either end of axle 12 to move outwardly relative to pivot pin 53. However, when longitudinal forces are inputted into tire-wheel assemblies 28, for example when the trailing beam suspension encounters an irregularity in the road surface, or abuts an upstanding wall, such as a curb, control arms 30 offer significant resistance against this movement as a result of the rigid interconnection between stabilizer bar 26 and axle 27. As can be seen, suspension system 1 offers a roll stable suspension which may be either roll flexible or roll rigid depending on the vertical spring rate of bushing 45 and the width of beam 45. Additionally, suspension system 1 is resistant to lateral force as a result of the width of beam 32 and to longitudinal forces as a result of control arms 30.

Figure 5:
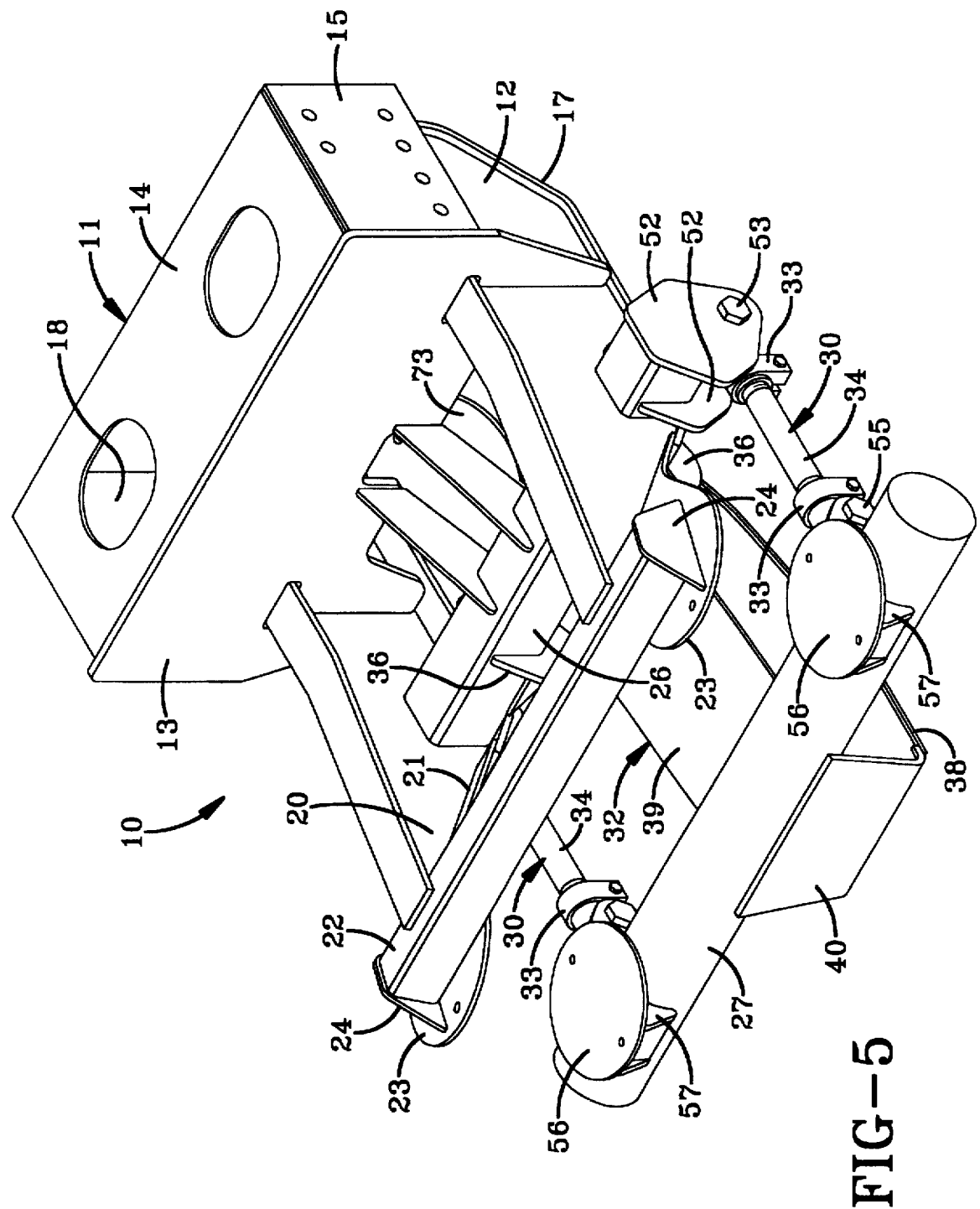
FIG. 5 is a perspective view of a second embodiment of the present invention.
Figure 6:
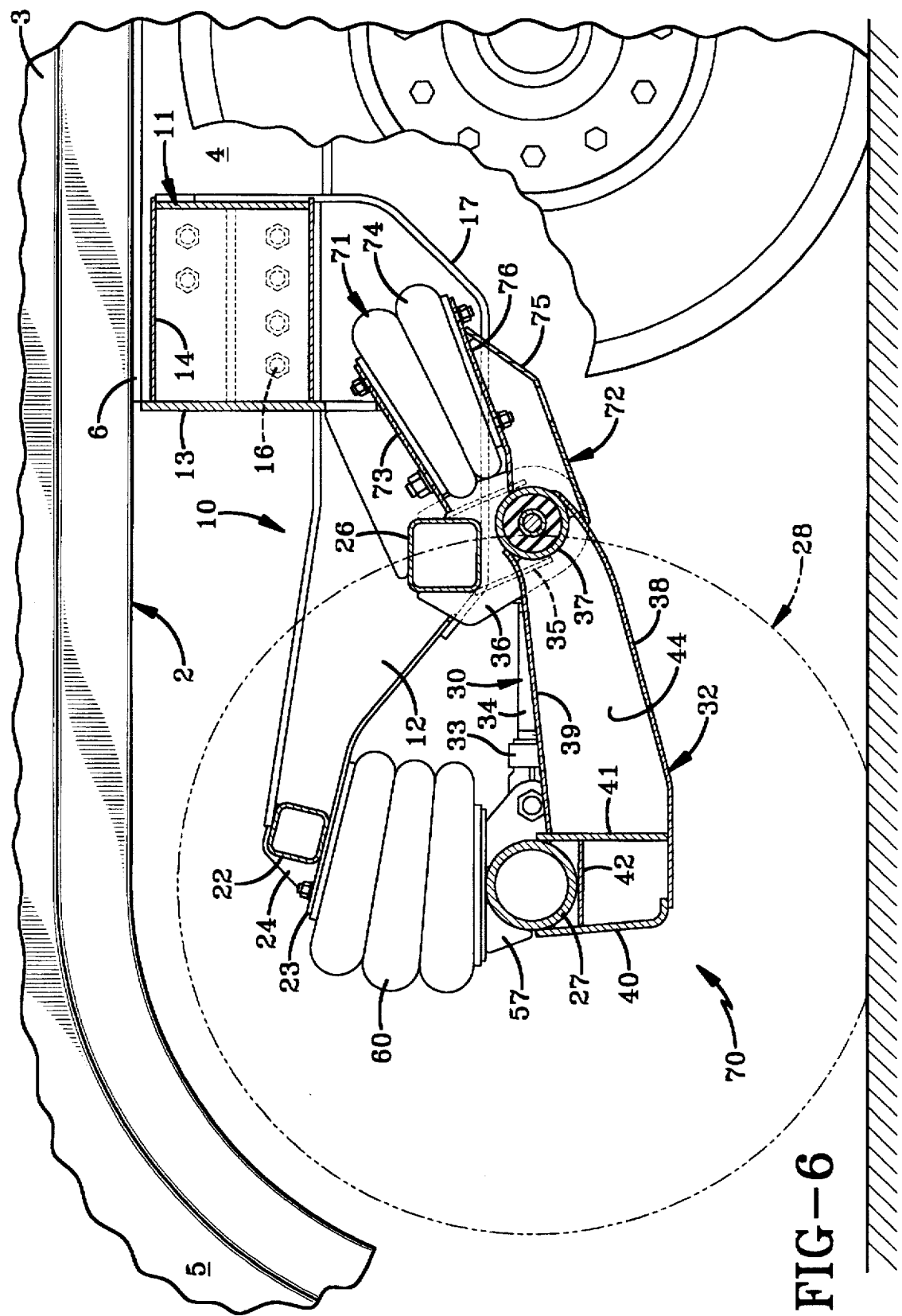
FIG. 6 is a sectional view of the second embodiment of the invention shown in FIG. 5 in a first operating position.
Figure 7:
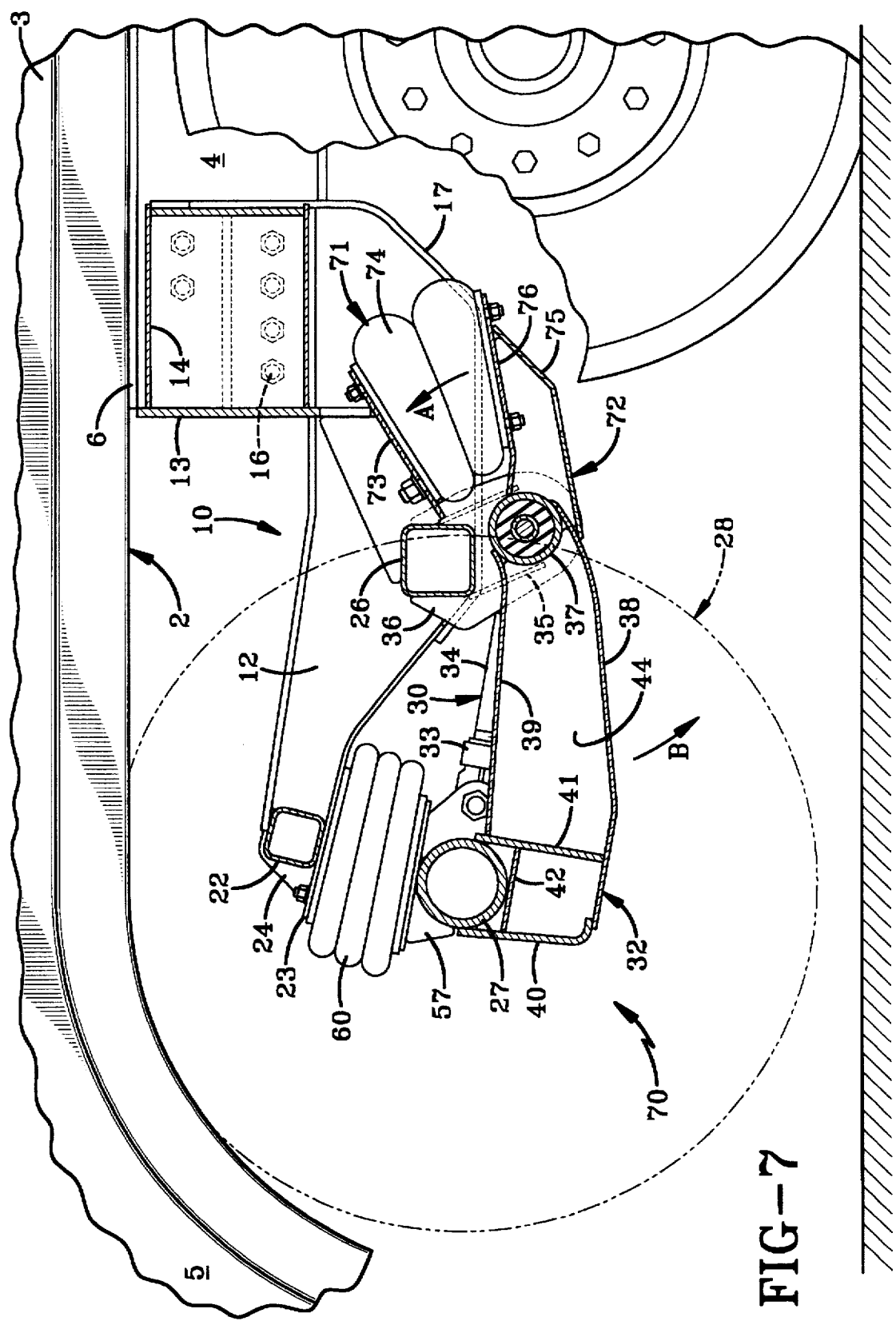
FIG. 7 is a sectional view of the second embodiment of the invention shown in FIG. 5 in a second operating position.

Referring next to FIGS. 5, 6 and 7, a second embodiment of the invention is shown, and is indicated generally at numeral 70. Suspension system 70 is identical to suspension system 1 except that it includes a lift mechanism 71 which includes a lift beam 72, a force plate 73 attached to frame extension assembly 10 and a lift spring 74. Lift spring 74 is positioned between force plate 73 and lift beam 72. Lift beam 72 includes a lower plate 75 and an upper plate 76 where lower plate 75 is welded to central beam 32 and upper plate 76 is secured to outer housing 37 of central beam 32. Force plate 73 is rigidly attached to frame extension assembly 10.

Suspension system 70 operates identically to suspension system 1 except that when lift spring 74 is expanded, it applies force against force plate 73 thereby applying a downward force to lift beam 72 causing central beam 32, interconnected axle 27 and tire-wheel assemblies 28 to rotate upwardly from the position shown in FIG. 6 to the position shown in FIG. 7. Conversely, when lift spring 74 is deflated as shown by arrow A, lift beam 72 will raise causing axle 27 and interconnected tire-wheel assemblies 28 to move in the direction of arrow B (FIG. 7) and to a lower, ground-engaging position.

A third embodiment of the invention is shown in FIG. 8, and is indicated generally at 80. Suspension system 80 operates identical to suspension system 1 except that suspension system 80 is mounted to a slider, and operates as a primary suspension system. More particularly, suspension system 80 includes a hanger bracket 81 bolted to a slider 82 via a plurality of bolts 83. In the preferred embodiment, hanger bracket 81 is attached directly to stabilizer bar 26 which acts as a suspension frame to support suspension system 80 from vehicle 2. Additionally, spring plate 23 is secured, at an angle to slider 82 via a plurality of mounting brackets 84. As can be seen from FIG. 8, suspension system 80 operates as a primary suspension system for vehicle 2 while offering all the benefits of a suspension system having a single central beam, and a plurality of spaced apart control arms.

Accordingly, the invention described above, successfully overcomes problems associated in the art, and creates a suspension system which is roll stable, resistant to lateral and longitudinal forces, and which may be tailored to be roll flexible or roll rigid depending on the particular requirements of vehicle 2. Moreover, the suspension system of the present invention provides an air ride suspension system which is applicable as a tag axle suspension, an auxiliary suspension beneath the vehicle, as well as a primary suspension system, whether liftable or non-liftable. The suspension system of the present invention also provides a mechanism for effectively eliminating the torque felt by the axle, and for accurately aligning, and realigning the suspension system in a simple, and effective manner.

Accordingly, the improved auxiliary suspension system is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved suspension system is constructed and used, the characteristics of the construction, and the advantageous, new and useful results obtained; the new and useful structures, devices, elements, arrangements, parts and combinations, are set forth in the appended claims.

I claim:

1. A suspension system adapted to be mounted to a vehicle frame comprising:
   an axle;
   a suspension frame;
   a pair of spaced apart rigid control arms extending between the axle and the suspension frame;
   a central beam non-rotatably secured to the axle and having a pair of spaced apart sidewalls and one of a top wall and a bottom wall extending between the suspension frame and the axle intermediate the control arms; and
   at least one air spring adapted to extend intermediate one of the vehicle frame and suspension frame and the axle.

2. The suspension system as defined in claim 1 further including a central pivot for pivotally mounting the central beam to the suspension frame and a side pivot for pivotally mounting each control arm to the suspension frame.

3. A suspension system adapted to be mounted to a vehicle frame comprising:
   an axle;
   a suspension frame;
   a pair of spaced apart control arms extending between the axle and the suspension frame;
   a central beam extending between the suspension frame and the axle intermediate the control arms;
   at least one air spring adapted to extend intermediate one of the vehicle frame and suspension frame and the axle; and
   a central pivot for pivotally mounting the central beam to the suspension frame and a side pivot for pivotally mounting each control arm to the suspension frame whereby the central pivot and the side pivots are axially aligned.

4. The suspension system as defined in claim 3 in which at least one of the central pivot and side pivots include an elastomeric bushing.

5. The suspension system as defined in claim 4 in which the central pivot includes an outer housing attached to the central beam; in which the elastomeric bushing is carried within the outer housing; and in which a pivot pin extends through the bushing and is adapted to be supported from the frame.

6. The suspension system as defined in claim 5 in which a pair of flanges extend downwardly from the suspension frame; in which the outer housing extends intermediate the flanges; and in which the pivot pin extends through the outer housing through the flanges for pivotally retaining the central beam to the suspension frame.

7. The suspension system as defined in claim 5 in which the bushing includes a vertical spring rate and a horizontal spring rate, and in which the vertical spring rate is different from the horizontal spring rate.

8. A suspension system adapted to be mounted to a vehicle frame comprising:
   an axle;
   a suspension frame;
   a pair of spaced apart control arms extending between the axle and the suspension frame;
   a central beam extending between the suspension frame and the axle intermediate the control arms;
   at least one air spring adapted to extend intermediate one of the vehicle frame and suspension frame and the axle;
   a central pivot for pivotally mounting the center beam to the suspension frame which includes a pivot means for pivoting the central beam relative to the suspension frame having a vertical spring rate and a horizontal spring rate whereby the vertical spring rate is different from the horizontal spring rate; and
   a side pivot for pivotally mounting each control arm to the suspension frame.

9. The suspension system as defined in claim 1 in which the beam has a width in the range of from 8 inches to 40 inches.

10. A suspension system adapted to be mounted to a vehicle frame comprising:
    an axle;
    a suspension frame;
    a pair of spaced apart control arms extending between the axle and the suspension frame; and
    a central beam having a top wall, a bottom wall and a pair of sidewalls defining a cavity therebetween, and extending between the suspension frame and the axle intermediate the control arms.

11. The suspension system as defined in claim 10 further comprising adjustment means for adjusting the angle of the axle relative to the frame.

12. The suspensions system as defined in claim 11 in which the adjustment means is an adjustable length control arm.

13. The suspension system as defined in claim 2 in which the central beam is centrally positioned between the control arms.

14. The suspension system as defined in claim 13 in which the central beam is welded to the axle.

15. The suspension system as defined in claim 14 in which the central beam has a pair of sidewalls; and in which the central beam contacts the axle continuously between the sidewalls.

16. The suspension system as defined in claim 13 further comprising a frame extension adapted for mounting to the rear of a truck frame; in which the frame extension includes a mounting box adapted to extend adjacent the frame rails; a pair of rigid beams mounted to the mounting box and adapted to extend rearwardly of the frame; and in which the suspension frame includes a stabilizer bar extending intermediate the beams and parallel to the axle.

17. A suspension system adapted to be mounted to a vehicle frame comprising:

an axle;

a suspension frame;

a pair of spaced apart control arms extending between the axle and the suspension frame;

a central beam extending between the suspension frame and the axle intermediate the control arms;

at least one air spring adapted to extend intermediate one of the vehicle frame and suspension frame and the axle;

a central pivot for pivotally mounting the central beam to the suspension frame and a side pivot for pivotally mounting each control arm to the suspension frame; and the center beam extending between the suspension frame and the axle and centrally positioned between the control arms whereby the center beam includes a pair of sidewalls and is welded to the axle, and is in contact with the axle continuously between the sidewalls.

18. A suspension system adapted to be mounted to a vehicle frame comprising:

an axle;

a suspension frame;

a pair of spaced apart control arms extending between the axle and the suspension frame;

a central beam centrally positioned between the control arms and extending between the suspension frame and the axle intermediate the control arms;

at least one air spring adapted to extend intermediate one of the vehicle frame and suspension frame and the axle;

a central pivot for pivotally mounting the central beam to the suspension frame and a side pivot for pivotally mounting each control arm to the suspension frame;

a frame extension adapted for mounting to the rear of the truck including a mounting box adapted to extend adjacent the frame rails, a pair of rigid beams mounted to the mounting box and adapted to extend rearwardly of the frame; and a stabilizer bar extending intermediate the beams and parallel to the axle.

19. The suspension system as defined in claim 18 in which the central pivot and side pivots depend from the stabilizer bar.

20. The suspension system as defined in claim 18 in which the central beam is positioned below the stabilizer bar.

21. The suspension system as defined in claim 2 in which one air spring is positioned adjacent each control arm.

* * * * *